United States Patent [19]
Greiner et al.

[11] 4,161,964
[45] Jul. 24, 1979

[54] RESERVOIR FOR FUEL INJECTION SYSTEM

[75] Inventors: Max Greiner, Gerlingen; Bernhard Temmen, Ludwigsburg, both of Fed. Rep. of Germany

[73] Assignee: Robert Bosch GmbH, Stuttgart, Fed. Rep. of Germany

[21] Appl. No.: 867,069

[22] Filed: Jan. 5, 1978

[30] Foreign Application Priority Data

Jan. 20, 1977 [DE] Fed. Rep. of Germany ....... 2702133

[51] Int. Cl.[2] ........................ F16L 55/04; F02M 69/00

[52] U.S. Cl. ........................................ 138/26; 123/136; 138/30; 220/85 B

[58] Field of Search ........................ 123/139 AW, 136; 138/26, 30, 31; 220/85 B; 417/540; 91/27

[56] References Cited

U.S. PATENT DOCUMENTS 4,000,758 1/1977 Meisenheimer, Jr. ................. 138/31

FOREIGN PATENT DOCUMENTS 722437 11/1965 Canada ........................................ 138/31
683936 11/1939 Fed. Rep. of Germany ............. 138/31

OTHER PUBLICATIONS

Bosch, "Technical Instruction; Fuel Injection - Continuous Fuel Injection System (CIS)", Copyright 1974, Robert Bosch GmbH, pp. 2, 18, 19.

*Primary Examiner*—Charles J. Myhre
*Assistant Examiner*—Tony M. Argenbright
*Attorney, Agent, or Firm*—Edwin E. Greigg

[57] ABSTRACT

A reservoir for a fuel injection system including an intermediate plate and a yieldable member movable relative thereto. The intermediate plate includes a flow opening and a throttle opening, the opening and closing of which are controlled by a valve. The valve is operatively connected with the yieldable member, which is biased toward the intermediate plate by a reservoir spring.

5 Claims, 2 Drawing Figures

RESERVOIR FOR FUEL INJECTION SYSTEM

BACKGROUND OF THE INVENTION

The invention relates to a reservoir of the type which includes a member that yields elastically against the force of a reservoir spring with a member arranged to lie in its rest position against an intermediate plate that divides the reservoir chamber, the intermediate plate being further arranged to include a throttle opening and a flow opening that can be closed by a valve.

Such a reservoir is already known for a fuel injection apparatus, in which the filling of the reservoir proceeds by means of a return flow valve and a throttle bore, thereby causing too long a delay in the pressure build-up so that malfunctions result in the fluid circuit. This type of device has a larger volume and the filling thereof is particularly slow and disadvantageous to use.

OBJECT AND SUMMARY OF THE INVENTION

The reservoir disclosed in this invention in contrast to the foregoing is superior to the known devices since it provides for a rapid filling of a portion of the reservoir and additionally the further advantage of only a short delay of the pressure build-up in the fluid circuit with a subsequent complete filling of the reservoir volume.

A further improvement of this invention is that the reservoir includes a chamber-like receptacle having an annular rim to which is secured by crimping a perforated cover. A diaphragm and a rigid axially perforated plate are also held by the crimping operation. The diaphragm is springloaded on opposite sides and the perforation in the rigid plate is closed by a valve member.

Still another advantage of the invention is that the perforated rigid plate is provided with a neck portion through which the valve member extends with the neck arranged to provide a seat for the valve member and further to allow for throttled fuel flow therethrough.

The invention will be better understood as well as further objects and advantages thereof become more apparent from the ensuing detailed description of the embodiment when taken in conjunction with the drawing.

DESCRIPTION OF THE PREFERRED EMBODIMENT

Figure 1:
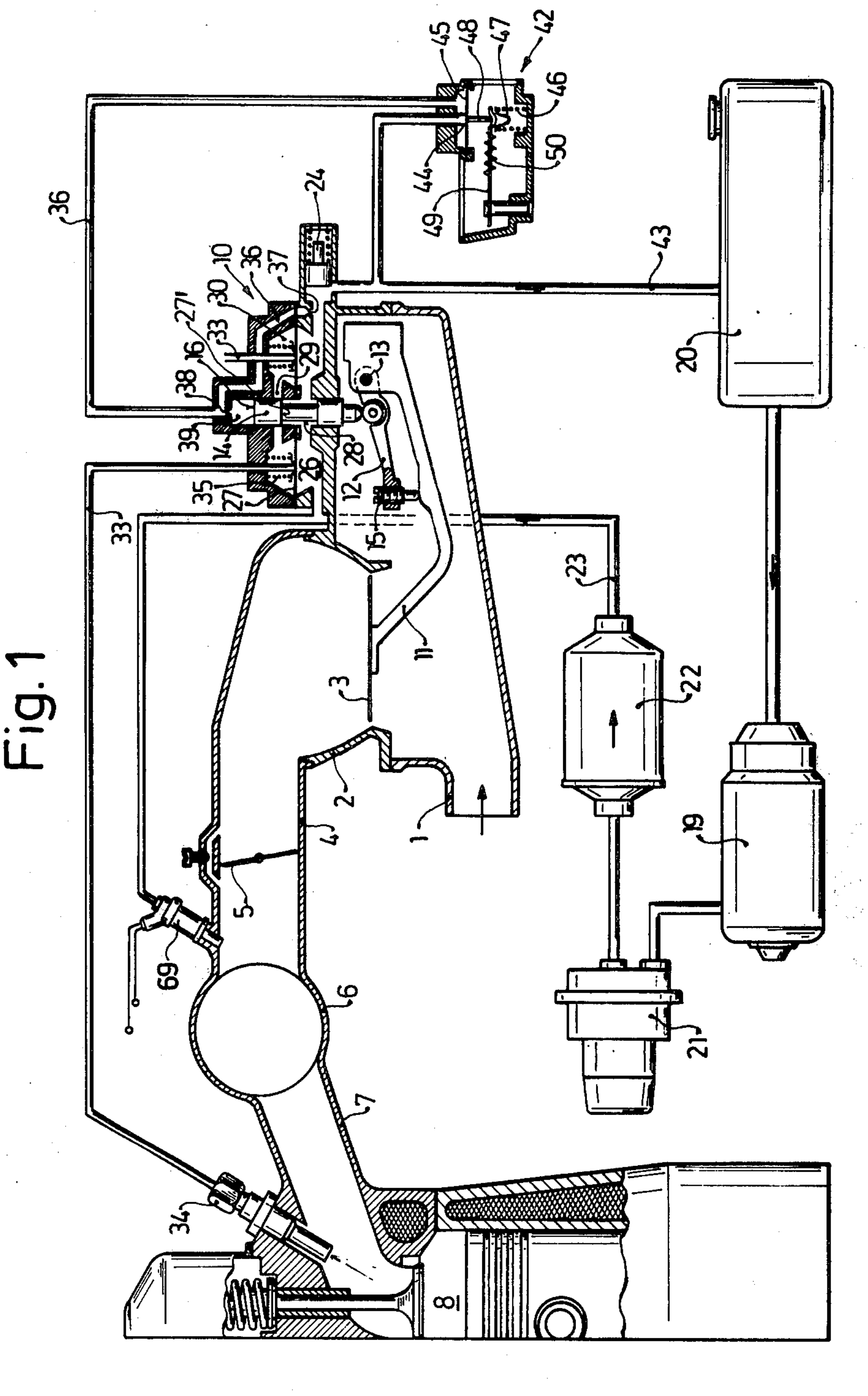
FIG. 1 is a diagram illustrating an embodiment of the fuel injection system including cold starting controls.

In the fuel injection system shown in FIG. 1, the combustion air flows in the direction of the arrow through an air induction tube 1 into a conical section 2 comprising an air funnel in which an air flow sensor plate 3 is arranged and then continues through an air induction tube section 4 with a manually operable throttle plate 5 to a common intake manifold 6 and from there through an air induction tube section 7 to one or more cylinders 8 of an internal combustion engine.

The air flow sensor comprises a plate 3 which is arranged perpendicular to the direction of air flow and moves in the conical section 2 of the air induction tube according to a nearly linear function of the air quantity flowing through the air induction tube. In this manner, the pressure prevailing between the air flow sensor plate 3 and the throttle plate 5 remains constant both for a constant return force action on the air flow sensor plate and for a constant air pressure prevailing in front of the air flow sensor plate. The air flow sensor plate 3 controls a fuel distributor valve generally indicated at 10. A rocking lever 11, which supports at one end the air flow sensor plate, is connected with a correcting lever 12 and mounted for rotation at the point indicated at 13. As the lever 11 swings, the ball bearing surface carried by lever 12 actuates a movable control plunger 14 of the fuel metering valve 10. The desired air-fuel mixture ratio can be set by means of a regulating screw 15. The radial surface 16 of the control plunger 14 situated remote from the aforementioned ball bearing surface is affected by fluid pressure which serves as a return or resetting force for the air sensor 3.

Fuel supply is effected by means of a fuel pump 19 which draws fuel from a fuel tank 20 and leads it through a fuel reservoir 21, a fuel filter 22 and fuel line 23 to the distributor valve 10. A pressure regulator 24 maintains pressure in the fuel injection system constant.

The fuel supply line 23 leads through various branches to chambers 26 of the distributor valve 10 so that the one side of the diaphragm 27 is acted upon by the fuel pressure, all of which is well known to those skilled in the art. Also the chambers 26 are in communication with an annular groove 28 of the control plunger 14. Depending on the setting of the control plunger 14, the annular groove therein opens more or fewer control slots 29 each of which leads to a chamber 30 with this latter chamber being separated from the chambers 26 by the diaphragm 27. Fuel travels from the chambers 30 through injection channels 33 to the individual injection valves 34, each of these injection valves being arranged near the engine cylinders 8 in the air induction tube section 7. The diaphragm 27 serves as a movable part of a flat seat valve which is maintained in an open position by a spring 35 when the fuel injection system is not functioning. The membrane boxes formed by the chambers 26 and 30 insure that, independently of the magnitude of the flow passage section of the metering slots 29 determined by the position of the control edge 27', that is, independently of the fuel quantities passing through the fuel injection valves 34, the pressure drop across the fuel metering valve 27', 29 is maintained at a level which is constant to a high degree. In this manner, it is insured that the setting motion of the control plunger 14 and immediate fuel quantities are proportionate to one another. In case of a pivotal motion of the lever 11, the air sensor plate 3 is displaced in the conical portion 2 of the air intake tube 1 so that the annular flow passage section which varies between the air sensor plate 2 and the internal wall of the conical portion 2 is proportionate to the displacement of the air sensor 3. In this manner, there is provided a linear dependence of the setting motion of the air sensor plate 3 and the displacement of the control plunger 14 and accordingly, there is achieved a proportionate fuel metering with respect to the through-going intake air quantities.

The pressurized liquid exerting a constant resetting force on the control plunger 14 is fuel. For this purpose a control pressure line 36 branches off from the fuel supply line 23 and is decoupled therefrom by a throttle 37. A pressure chamber 39 is connected to the control pressure line 36 by means of a damping throttle 38 and the control plunger 14 projects into this pressure chamber 39 with its radial face 16. A pressure control valve is arranged in the control pressure line 36 by means of which the pressure fluid can travel unpressurized through a return line 43 back to the fuel container 20. By means of the pressure control valve, indicated generally by the numeral 42, the pressure of the fluid that produces the return force can be varied during the warming up of the internal combustion engine according to a temperature and time function. The pressure control valve 42 is embodied as a flat seat valve having a stationary valve seat 44 and a diaphragm 45 which is biased in the closing direction of the pressure control valve by a spring 46. The spring 46 acts on the diaphragm 45 by means of a spring plate 47 and a transfer pin 48. At temperatures below the engine operating temperature, the spring 46 acts against a bimetallic spring 49 upon which an electric heating element is arranged. After starting of the engine, the heating of this element leads to a decrease of the force of the bimetallic spring 49 on the spring 46 so that the control pressure line 36 increases.

The fuel reservoir 21 is adapted to prevent difficulties during renewed starting of a hot internal combustion engine after it has been shut off, when, because of subsequent higher heating of the engine without coolant (cooling air, cooling water) being supplied:

1. a portion of the fuel contained in the fuel injection device evaporates, leading to a fuel deficiency during starting after cooling by volume dissipation, 2. during cooling of the fuel by volume dissipation pressure in the closed device decreases and elements that operate in dependence on pressure, such as the fuel metering valve, are set into positions where too rich of a mixture is supplied so that the engine "floods" during starting, 3. a volume decrease has been caused by continually present leakage.

Figure 2:
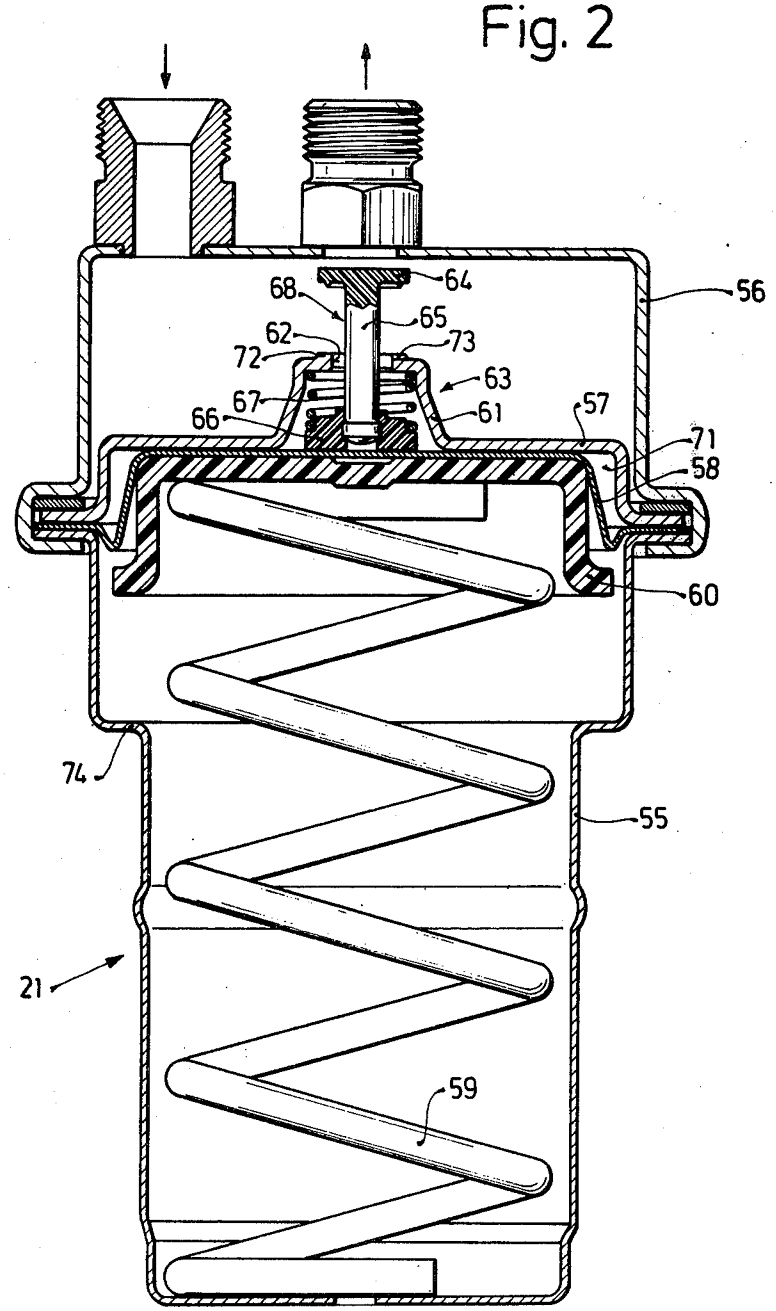
FIG. 2 is a detailed cross-sectional view of the improved reservoir.

The fuel reservoir 21 shown in FIG. 2 comprises a receptacle 55 and an apertured cover 56 which is connected to the receptacle by deforming an annular flange portion and crimping it about a flange carried by the receptacle, all of which is clearly shown in FIG. 2. An intermediate centrally apertured plate 57 and an elastic diaphragm 58 extend across the receptacle 55 in the area of the respective flange portions with the diaphragm 58 thereby arranged to serve as a yielding reservoir member. A reservoir spring 59 having a flat characteristic curve is arranged in the receptacle 55 with the spring 59 arranged to contact a cup-shaped member having an annular flange 60 said cup in turn being in abutting arrangement with the diaphragm 58. The intermediate plate 57 has an outwardly extending cup-shaped neck portion 61 which is arranged to project in the direction of the cover and in opposition to the diaphragm and is centrally apertured as at 62. The valve assembly indicated generally at 63 comprises a shank member 65, at one end of which is positioned a valve plate 64 that is adapted to close a central aperture in the cover 56 with the opposite end of the shank being provided with an enlarged terminal portion 66 that rests against the diaphragm 58. A coil spring 67 is interposed between the annular ledge of the terminal portion 66 and the inner surface of the neck 61.

The dimensions of the reservoir 21 are so chosen with regard to the fuel injection system that after the fuel pump 19 has been turned on, it can hold the fuel pressure in the entire fuel injection device beneath the opening pressure of the fuel injection valve yet above the evaporating pressure of the fuel at a given engine temperature until the entire device has been filled with fuel. Operation of a fuel injection system provided with the known fuel reservoir has demonstrated that the filling time of the empty fuel reservoir with an appropriate volume of 40 $cm^3$ takes about 1.5 to 2 seconds. After this time interval, the fuel pressure directly in front of the injection valves has climbed to the opening pressure of the injection valve 34. Frequently what takes place is that immediately after the starting fuel is injected, temperature and time-dependently by means of an electric starting valve 69 into the induction tube section directly upstream of the collecting tube 6, it will happen that the internal combustion engine will start spontaneously about one second after activation of the starting switch, however, the engine then stalls because no fuel is being injected from the injection valves 34. In other words, the control plunger 14 of the fuel distributor valve 10 is shifted by the increasing control pressure in the pressure chamber 39 into a position in which an insufficient quantity of fuel is supplied with relation to the intake air quantity so that a too lean air-fuel mixture results.

According to the invention, therefore, the fuel reservoir 21 is provided with the valve assembly 63 referred hereinbefore, which when the fuel reservoir is empty, is completely opened by the diaphragm 58 that forms the yielding reservoir member so that during the starting process the fuel supplied by the fuel pump 19 can flow through the completely opened aperture 62 provided in the neck portion 61 of the intermediate plate 57 into the reservoir chamber 71. The system pressure in the fuel injection device thereby increases according to the reservoir characteristic curve determined by the spring 59. According to the invention the diaphragm 58 and the plate 60 moves away from the intermediate plate 57 in a direction to enlarge the reservoir volume up to about half of the possible total reservoir volume where the actuating shank 65 disengages the diaphragm 58 and the lower surface of the valve plate 64, as viewed in the drawing, then engages on a radial surface of the apertured neck 61 thereby closing the aperture d62. It will be noted that the lower surface of the valve plate 64, as viewed in the drawing in FIG. 2, includes an annular bead which is formed complementally to the valve seat that is formed integral with the upstanding neck 61.

The time required for filling approximately half of the possible total reservoir volume of about 20 $cm^3$ is about 0.7 seconds, that is less than the time necessary for a possible spontaneous starting of the internal combustion engine. The pressure in the entire injection system can then climb to the value determined by the system pressure regulator 24 so that a sufficient fuel supply is guaranteed during the starting of the internal combustion engine. The filling of the reservoir up to the possible total reservoir volume occurs although delayed by means of a throttle opening which can be embodied for example, as a notched area 73 in the rigid valve seat 72, so that despite the annular ring carried by the valve plate 64 resting on the rigid valve seat 72, throttled fuel can flow through this notched area 73 into the reservoir chamber 71 until the plate 60 lies against an annular shelf 74 that is formed in the receptacle 55 and the possible total reservoir volume is attained.

This novel embodiment of the valve assembly 63 attains a lessening of the pressure build-up time in the fuel injection system up to about 0.7 seconds so that it is no longer necessary to have to start an engine twice.

The foregoing relates to a preferred exemplary embodiment of the invention, it being understood that other embodiments and variants thereof are possible within the spirit and scope of the invention, the latter being defined by the appended claims.

What is claimed is:

1. A fuel reservoir for a fuel injection system, comprising:

a housing defining a chamber;

an intermediate plate mounted to the housing within the chamber for dividing the chamber into two parts, said intermediate plate having a flow opening and a throttle opening formed therein;

a yieldable reservoir member mounted to the housing within one of the chamber parts and dividing that chamber part into two portions;

reservoir spring means mounted within the chamber portion facing away from the intermediate plate and engageable with one side of the yieldable reservoir member, wherein the yieldable reservoir member lies against the intermediate plate in its rest position under the influence of the reservoir spring means; and valve means operatively associated with the flow opening and throttle opening in the intermediate plate, said valve means comprising:

a movable valve member; and a valve spring engageable with the movable valve member in the opening position of the valve means when the reservoir experiences a movement to decrease its volume, said movable valve member including:

(i) a shank member that projects through the flow opening and is displaceable by means of the yieldable reservoir member against the force of the valve spring; and (ii) a valve plate.

2. The fuel reservoir as defined in claim 1, wherein the intermediate plate has a cup-shaped neck portion which extends outwardly away from the yieldable reservoir member, said cup-shaped neck portion having a frontal surface within which the flow opening is defined, said frontal surface serving as a rigid valve seat.

3. The fuel reservoir as defined in claim 2, wherein the throttle opening is provided between the valve plate and the rigid valve seat in the closed position of the valve means.

4. The fuel reservoir as defined in claim 3, wherein the yieldable reservoir member disengages the shank member during enlargement of the reservoir volume, and especially after filling a predetermined volume portion of the reservoir, in particular approximately one-half of the total reservoir volume, at which time the flow opening is closed by the valve plate.

5. The fuel reservoir as defined in claim 1, wherein the yieldable reservoir member is an elastic diaphragm.

* * * * *